(12) United States Patent
Sauer et al.

(10) Patent No.: US 6,675,675 B1
(45) Date of Patent: Jan. 13, 2004

(54) STEERING WHEEL

(75) Inventors: Frank Sauer, Niedernberg (DE); Andreas Hans, Niedernberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/980,594

(22) PCT Filed: Jun. 2, 2000

(86) PCT No.: PCT/DE00/01855
§ 371 (c)(1),
(2), (4) Date: Mar. 13, 2002

(87) PCT Pub. No.: WO00/74980
PCT Pub. Date: Dec. 14, 2000

(30) Foreign Application Priority Data

Jun. 4, 1999 (DE) .......................... 199 27 032

(51) Int. Cl.[7] .................................. G05G 1/10
(52) U.S. Cl. .......................... 74/552; 280/731
(58) Field of Search .................. 74/552; 280/728.1, 280/743.1, 731, 728.2; 200/61.54, 61.55, 61.56, 61.57

(56) References Cited

U.S. PATENT DOCUMENTS

| 5,350,190 A | | 9/1994 | Szigethy | |
|---|---|---|---|---|
| 5,380,037 A | | 1/1995 | Worrell et al. | |
| 5,459,294 A | * | 10/1995 | Danielson | 200/61.54 |
| 5,738,369 A | * | 4/1998 | Durrani | 280/731 |
| 6,139,051 A | * | 10/2000 | Fujita | 280/731 |
| 6,257,615 B1 | * | 7/2001 | Bohn et al. | 280/728.2 |

FOREIGN PATENT DOCUMENTS

| DE | 29602630 U1 | 6/1996 |
|---|---|---|
| DE | 19503816 A1 | 8/1996 |
| DE | 29621295 U1 | 2/1997 |
| DE | 19725684 C1 | 12/1998 |
| EP | 0822123 A1 | 2/1998 |
| GB | 2336135 A | 10/1999 |
| WO | WO 98/15431 | 4/1998 |

* cited by examiner

Primary Examiner—David A. Bucci
Assistant Examiner—Timothy McAnulty
(74) Attorney, Agent, or Firm—Foley & Lardner

(57) ABSTRACT

The invention relates to a steering wheel comprising a steering wheel body (30), an airbag unit (3), a detent connection for fixing the airbag unit to the steering wheel body, a contact device having a first and a second contact (8, 9) that are short-circuited for triggering an electric function element, especially an electric horn (24), when the airbag unit is moved in a direction toward the steering wheel body by a pressure exerted on said airbag unit. According to the invention, one of the detent elements of the detent device is, at least in part, electrically conductive and simultaneously forms the first contact (8) of the contact device. When an airbag is fastened according to the floating horn principle, the number of required parts is further reduced and it is possible to easily and securely fix the airbag unit to the steering wheel without the use of tools.

17 Claims, 7 Drawing Sheets

STEERING WHEEL

BACKGROUND

The invention relates to a steering wheel having a latching element for latching an airbag module to the steering wheel body and an electric contact.

Airbag units serve to protect a motor-vehicle occupant and these days usually form part of the standard equipment of a motor vehicle. Since installation of the airbag unit via screws has proven very complicated, various options for fastening it via latching connections have been proposed.

DE 296 02 630 describes a latching device for fastening an airbag module to a vehicle part, the latching device being designed in such a manner that pressing-on and/or rotating the airbag module causes a locking body to engage in a correspondingly shaped mating piece and the airbag module is thus fixed on the vehicle part. As the locking body, one exemplary embodiment provides a bent piece of spring steel which is wound around a cylindrical projection and can snap into a hook on a steering wheel body.

DE 296 21 295 discloses a device for fastening an airbag module in the steering wheel with at least one passive latching element and a pivotable or displaceable, rigid component as the active latching element, one element of which is provided on the steering wheel and the other element of which is provided on the airbag module. A resiliently mounted, pivotable hook is also suitable as the active latching element.

DE 195 08 816 describes an arrangement for fastening an airbag module to a steering wheel body, in which the mounting takes place by means of a bolt engaging in a resilient latch. In one embodiment, hooks are provided on the airbag module and leg springs on the steering wheel, the hooks being latched to a leg of the spring.

DE 197 25 684 discloses a steering wheel having an airbag module which is fastened to the steering wheel body by means of a latching connection, the latching connection having a resilient element which is tensioned during the installation process and snaps back into the fixing position when the latching takes place. This element is formed on the steering wheel or the airbag unit by a pretensioned wire ring which is secured to hook-shaped formations. Formations which push away the wire ring counter to its pretensioning during the installation and become hooked on the wire ring in the fixing position are provided on the airbag unit and on the steering wheel.

U.S. Pat. No. 5,350,190 describes connecting elements between an airbag module and a steering wheel, which elements enable the airbag module to move toward the steering wheel and away from the steering wheel. The connecting elements consist in each case of two parts, the first part being connected to the steering wheel and the second to the airbag module. The two parts engage telescopically in one another, are secured against slipping apart by an annular lip and can be latched in one another by this lip. The two parts are pretensioned with respect to each other, for example by a spring. These types of fastening do ensure simplified installation of the airbag unit. However, the arrangement of the airbag unit in the center of a steering wheel conceals a further problem. This is because usually the horn signal, which is intended to enable the driver to issue a warning signal in critical situations, is triggered by the pressure on the center of the steering wheel of the vehicle. In this case, at least a subregion of a covering is moved in the direction of the steering wheel body and an electric switching contact is therefore short-circuited.

U.S. Pat. No. 5,350,190 describes connecting elements between an airbag module and a steering wheel, which elements enable the airbag module to move toward the steering wheel and away from the steering wheel. The connecting elements consist in each case of two parts, the first part being connected to the steering wheel and the second to the airbag module. The two parts engage telescopically in one another, are secured against slipping apart by an annular lip and can be latched in one another by this lip. The two parts are pretensioned with respect to each other, for example by a spring. These types of fastening do ensure simplified installation of the airbag unit. However, the arrangement of the airbag unit in the center of a steering wheel conceals a further problem, because usually the horn signal, which is intended to enable the driver to issue a warning signal in critical situations, is triggered by the pressure on the center of the steering wheel of the vehicle. As a result, at least a subregion of a covering is moved in the direction of the steering wheel body and an electric switching contact is therefore short-circuited.

The arrangement of airbag units in the steering wheel causes problems with regard to the spatial arrangement of the contacts for triggering the horn. Although separate actuating levers, for example combined with switching levers for the light or windshield wipers, are used at discrete locations, they have proven disadvantageous, since the driver is not used to this and therefore requires an excessive amount of time in order to trigger the horn signal.

One attempt to solve this problem involves the "floating horn" principle. In this case, the airbag unit is arranged on the steering wheel in such a manner that a pressure exerted by the driver on the airbag unit causes the horn signal to be triggered. Usually in this case, one contact is arranged on the airbag unit and one on the steering wheel and the airbag unit is connected to the steering wheel via flexible components. As a result, when a pressure is exerted on the airbag unit, movement of the airbag unit toward the steering wheel causes the contacts to be short-circuited and the horn to therefore be triggered.

Usually, the (electrically conductive) steering wheel frame or the generator support of the airbag unit form a first contact, and a corresponding, second contact is provided on the respective other part. In many cases, an additional contact bridge is arranged as the contact on the steering wheel.

In all of the above-described devices for latching an airbag unit to a steering wheel, additional parts have to be provided if the airbag unit is to be used according to the "floating horn" principle for triggering the horn.

It is therefore desirable, in the case of an airbag fastening according to the "floating horn" principle, to further reduce the number of required parts and, in the process, to make it possible at the same time to secure the airbag unit to the steering wheel body in a manner which is simple, secure and can be carried out without a tool.

SUMMARY OF THE INVENTION

This object is achieved by provision of a steering wheel having a latching element for latching an airbag module to the steering wheel body and an electric contact.

According to an embodiment of the present invention a steering wheel having a steering wheel body, an airbag unit, a latching connection for securing the airbag unit to the steering wheel body, and a contact device is provided. That contact device may include at least one first and one second contact which, in order to trigger an electric functional element, in particular an electric horn, are short-circuited if the airbag unit is moved in the direction of the steering wheel body by a pressure exerted on said airbag unit. The first contact may be a component of a latching element of the latching connection, and the latching element may be formed by a wire element.

For this purpose, the wire element of the latching connection is at least partially electrically conductive and at the same time forms a first contact of the contact device.

In this embodiment, the airbag unit is preferably secured to the steering wheel frame of part of the steering wheel body. However, in general steering wheel body is understood to mean the entire steering wheel without an airbag unit.

It is preferred for at least one elastic spacer element for setting a distance between the steering wheel body and the airbag unit to be provided. The spacer element can be deformed by a pressure being exerted on the airbag unit, as a result of which the first and the second contact are short-circuited. It is possible for the functions of the latching element and of the spacer element to be implemented in one component, for example in which the latching element is pretensioned and this distance between the airbag unit and steering wheel is also set in this manner and the movement of the airbag unit toward the steering wheel is made possible. However, separate elements are preferably provided, in which case the spacer element can at the same time secure the latching connection by counteracting any movement of the airbag unit toward the steering wheel which goes beyond the position designated for the inoperative position.

The second contact is preferably formed by at least one contact rivet. By latching element functioning as a contact, a further component is not required for the contact. The close, functional relationship between the latching element and the contact also simplifies the production by a separate positioning of fastening elements and electric contacts being rendered unnecessary.

In a preferred embodiment, the wire element extends essentially along the circumference of the airbag unit. The wire element can be secured either to the airbag unit or to the steering wheel.

The wire element is preferably embedded in the airbag unit or the steering wheel frame. In order to form the first contact of the latching element, a cutout is provided in the airbag unit or in the steering wheel frame and the latching element is accessible through said cutout and can be short-circuited by the second contact. By means of the embedding, the wire element is fixed in the airbag unit or the steering wheel frame and a displacement in the contact connection is effectively prevented even when relatively thin and elastic wire elements which are particularly suitable for the latching are used. Embedding in the airbag unit is possible in a particularly simple manner if, for example, part of the housing of the airbag unit or the generator support consists of plastic. The wire element can then be placed into the injection mold, when producing this part by injection molding, and injected during the production of the injection molded part.

As an alternative, it is also possible to latch the wire element to the airbag unit or to the steering wheel.

It is preferred for a piece of spring steel, preferably with a diameter in the range of from 1 to 5 mm, to be used as the wire element. The piece of spring steel firstly ensures the flexibility which is desired for the latching, and secondly has the conductivity required for the function as a contact. The use of wire made of other metals and alloys having suitable material properties is also possible.

The latching of the steering wheel and airbag unit preferably takes place by the wire element which is secured to one of the two parts having bow-shaped sections. The bow shaped parts are assigned to hook-shaped latching elements on the other part. The airbag unit is plugged onto the steering wheel and, when pressure is applied counter to the force exerted by the spacer elements, the bow-shaped sections are deflected from their normal position, with the result that they can slide past the hook-shaped latching elements. On reaching the fixing position, the bow-shaped sections snap into the assigned, hook-shaped latching elements and are then again situated in their normal position. As mentioned above, the bow-shaped sections and hook-shaped latching elements may be placed on either of the steering wheel or airbag units.

The spacer elements provided between the airbag unit and the steering wheel and the deflection of the bow-shaped sections, which deflection is required for latching purposes, prevent the latching connection from being able to be released by any further movement of the airbag unit and steering wheel toward each other. If necessary, the connection may nevertheless be released in a very simple manner by deflecting the bow-shaped sections using a suitable tool, such as a screwdriver.

Two and, in particular, three bow-shaped sections having assigned, hook-shaped latching elements are preferably provided. The use of three latching elements in an arrangement with respect to each other at suitable angles permits self-centering of the airbag unit. As a result, the contact gap can be kept particularly small, which is desirable both for esthetic reasons and also to provide a reduced risk of soiling.

In a particularly preferred embodiment, the wire element secured to the airbag unit and to the steering wheel is of annular design. It preferably has bows which extend essentially perpendicular with respect to the plane clamped by the wire element, from the airbag unit in the direction of the steering wheel and from the steering wheel in the direction of the airbag unit.

The hook-shaped latching elements expediently have a bevel on which the bow-shaped sections of the wire element are guided for deflection purposes during the latching of the airbag unit to the steering wheel. For example, a ramp can be provided. The lower surface of the hook can also have different forms. It is thus possible, for example, for the lower surface to be smooth, bevelled or curved.

Since according to the invention the wire element at the same time forms one of the contacts for triggering the horn, it is necessary to insulate the wire element from the second contact. A contact rivet is generally provided as the second contact. Depending on the design, the second contact can preferably be formed by a component of the airbag unit, for example the gas generator or the support thereof, or by the steering wheel frame. The component having the second contact is usually made of metal and is therefore electrically conductive. However, it is just as readily possible to connect the contact rivet via a cable.

If the latching element forming the contact is provided on the steering wheel, the bottom of a housing of the airbag unit, the generator support or the gas generator whose housing is usually metallic, expediently serves as a second contact. If the latching element forming the contact is provided on the airbag unit, the second contact is generally formed by the steering wheel frame which is in any case metallic.

The invention does not require the provision of an additional contact bridge.

In order to insulate the latching element forming the contact from the second contact, the latter is insulated in the regions in which it bears in the inoperative position against the part forming the mating contact. In the case of the preferred use of a wire element as the contact, plastic bushings in the form of clip elements, shrinkable tubing elements or a coating of dipping paint, for example, are suitable for the insulation. The latching element forming the contact can preferably be connected electrically via a connector lug.

The use of plastic bushings or a shrinkable tubing as insulating elements has the advantage that these act at the same time as damping elements for possible actuating noises.

The spacer elements ensure, on the one hand, that the airbag unit is securely latched to the steering wheel. On the other hand, they serve for setting the required distance, i.e. the contact gap, between the airbag unit and steering wheel in the inoperative position. The force which the spacer elements to oppose the movement of the airbag unit toward the steering wheel is determined to ensure hat the counterforce required for triggering the horn is not excessively great but large enough so that the horn signal will not be inadvertently triggered by vibration of unintentional touching. Helical springs are preferably provided as the spacer elements. Plastic parts having an appropriate elasticity are also suitable.

In order to secure the airbag unit from being displaced laterally with respect to the steering wheel, centering elements are preferably provided. Pins on one of the parts, which engage in corresponding depressions on the other part, are particularly suitable for this. In a preferred embodiment, the pins are arranged as centering elements within the helical springs serving as the spacer elements.

BRIEF DESCRIPTION OF THE DRAWINGS

In the drawings:

FIG. 1 shows, in an exploded illustration, a generator support 4 of an airbag unit, a latching element in the form of a wire element (spring wire) 12 which at the same time forms a first contact 8 of the contact device for the triggering of the horn, and plastic bushings as insulating elements 15.

Figure 1:
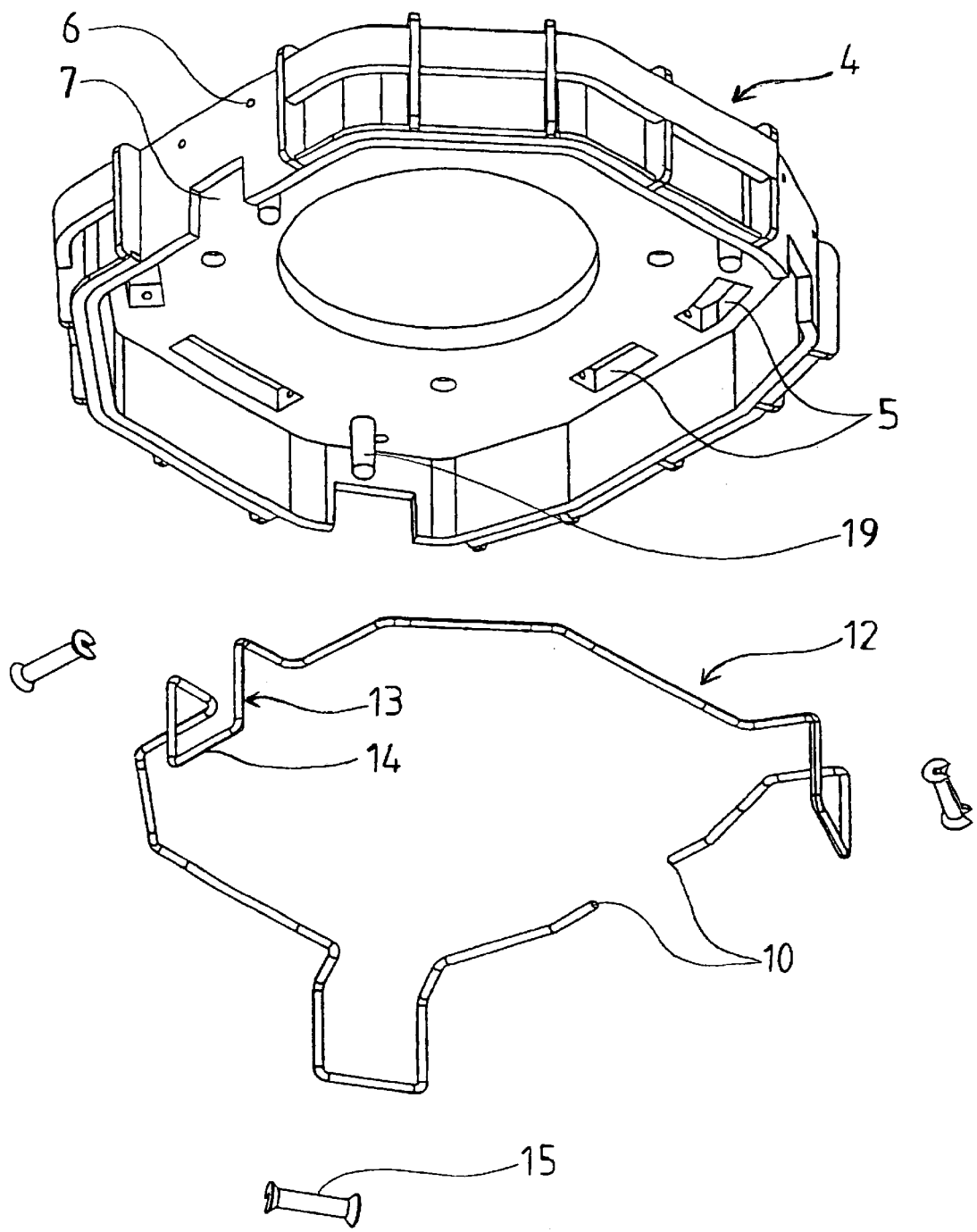
FIG. 1 shows, in an exploded illustration, a generator support of an airbag unit having a latching element for the provision of a latching connection to a steering wheel.

The generator support 4 is produced from plastic by injection molding and at the same time forms the bottom of a housing (not shown here) of the airbag unit 3. The generator support 4 has openings 6 for the wire element 12 and recesses 7 for latching hooks (not illustrated in FIG. 1) of a steering wheel body 30 which is intended to be latched to the generator support 4. Furthermore, cutouts 5 are provided for the provision of contact regions.

The wire element 12, which is shown separately for illustration purposes, is essentially matched in its shape to the circumference of the generator support 4. It has electric connections 10 and bow-shaped sections 13. During the production of the generator support, the wire element 12 is injected into the generator support. The bow-shaped sections 13 of the wire element 12 then protrude out of the openings 6 of the support 4. The wire element 12 is also accessible in the cutouts 5.

Before the generator support 4 is latched to a steering wheel body, insulating elements 15 are plugged onto the lower region 14 of the bow-shaped sections 13 of the wire element 12. The insulating elements 15 serve at the same time as noise-damping elements in order to prevent noises possibly occurring through the actuation of the horn or if the motor vehicle vibrates.

Figure 2A:
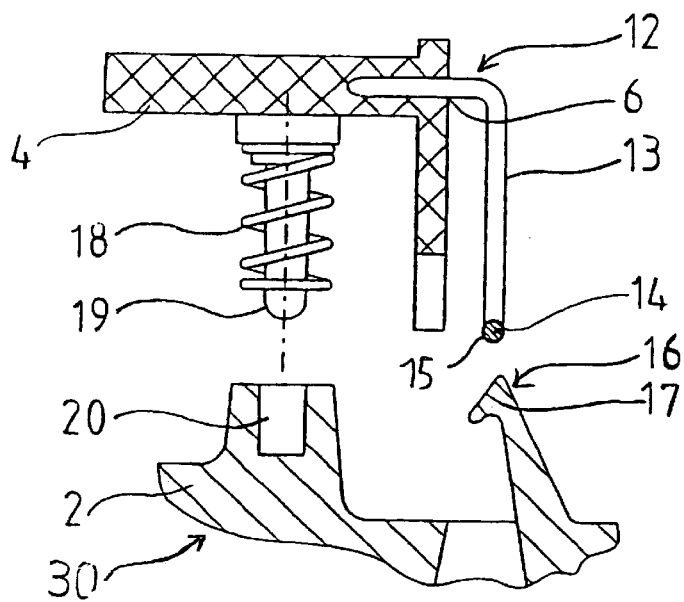
FIG. 2 shows a detailed view of a latching connection before (2a), during (2b) and after (2c) the latching.
Figure 2B:
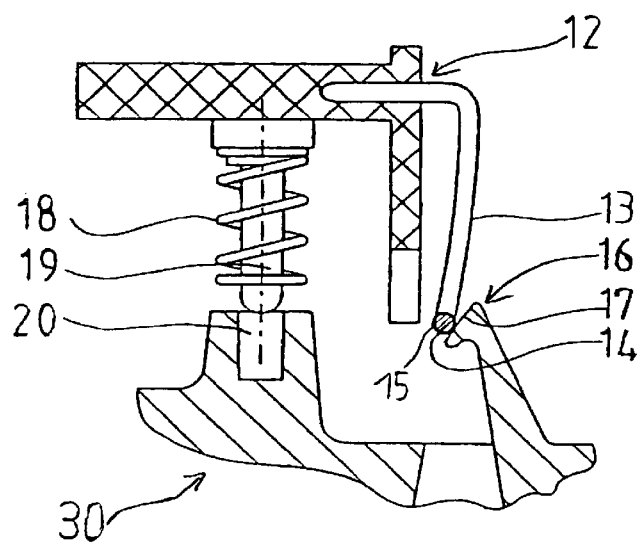

FIG. 2 illustrates in detail a section through a latching connection between the generator support 4, which is shown in FIG. 1, and a steering wheel body 30 before (a), during (b) and after the latching (c). A section of the frame 2 of the steering wheel 1 having a depression 20 and a latching hook 16 is seen. The latching hook 16 has a sloped surface 17 for guiding the bow-shaped section 13 of the wire element 12 during the latching. Furthermore, a shrinkable tubing can be used as the insulating element 15, which tubing is applied to the lower region 14 of the bow-shaped section 13 as a layer.

The wire element 12 is injected into the generator support 4 of the airbag unit. The bow-shaped sections 13 of the wire element 12 protrude out of the openings 6 of the generator support 4. The bow-shaped sections extend essentially perpendicular with respect to the plane of the wire element 12, which plane corresponds to the surface of the generator support 4, toward the steering wheel body 30.

Furthermore, on the generator support 4 of the airbag unit, pins 19 are assigned as centering elements to the depressions 20 in the steering wheel frame 2, in order to secure the airbag unit against being displaced laterally with respect to the steering wheel body 30. The steering wheel frame 2 is part of the steering wheel body 30. Spiral springs 18 are arranged around the pins 19 and serve as spacer elements for setting the distance between the airbag unit and the steering wheel 1.

For the latching, the airbag unit is plugged onto the steering wheel body 30 in a position which is determined by the bows 13 and the centering elements 19, 20. As a result, the lower regions 14 of the bow-shaped sections 13 of the wire element 12 come into contact with the slopes 17 of the latching hooks 16. When further pressure is exerted, the lower regions 14 of the bows 13 slide along the slope 17 and in the process are deflected. At the same time, the pins 19 engage in the depressions 20 and the spiral springs 18 are placed around the depressions 20 on the steering wheel frame 2.

Figure 2C:
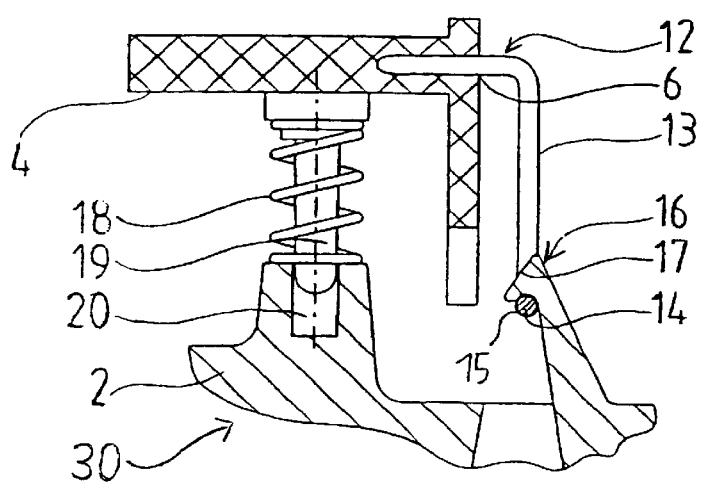

As soon as the airbag unit 3 has approached the steering wheel body 30 up to the predetermined distance shown in FIG. 2c, the lower regions 14 of the bow-shaped sections 13 of the wire element 12 can snap in behind the latching hook 16. The use of spring steel for the wire element 12 permits the latching arrangement according to the invention to be released again and to be latched in again virtually as often as desired. In order to release the latching connection, the bow-shaped sections 13 have merely to be deflected from their normal position through a corresponding opening by a hand tool. The airbag unit 3 can then be removed from the steering wheel body 30.

In the inoperative position, the spiral springs 18 are under a certain amount of pretension and therefore offer a defined force to oppose the airbag unit 3 from moving closer to the steering wheel body 30. As a result, the latching connection is, on the one hand, additionally secured against unintentional release. On the other hand, the force can be overcome by a pressure on the airbag unit 3, the electric, first contact arranged on the airbag unit 3 can be short-circuited by an associated, second contact on the steering wheel body 30 and the electric horn of the vehicle can therefore be triggered.

Figure 3:
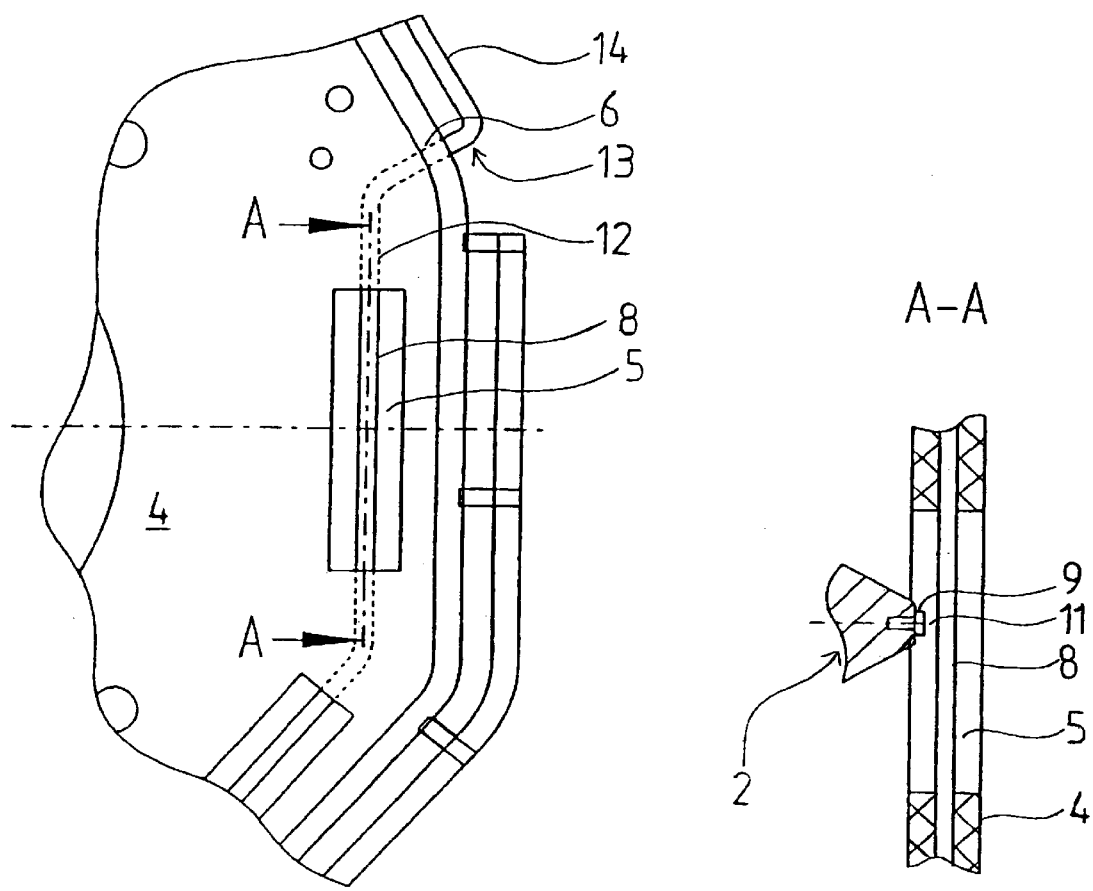
FIG. 3 shows a detailed view of a contact region of the latching connection in plan view and in section.

FIG. 3 illustrates a plan view of the contact region of the airbag unit. A part of the generator support 4 with the inserted wire element 12 and a cutout 5 in the surface of the generator support 4 is seen. The wire element 12 is accessible and is not electrically insulated in this cutout 5. According to the invention, the wire element 12 forms a first contact 8 for the triggering of the horn.

The section along the line A—A additionally shows part of the steering wheel frame 2. A contact rivet 9 fastened to the electrically conductive steering wheel frame 2 is provided as the second contact. It can furthermore be seen that the contact gap 11 between the first contact 8 and the second contact 9, and therefore the distance between the airbag unit 3 and steering wheel body 30 in the inoperative position, can be kept very small.

As an alternative to the electrically conductive steering wheel frame 2, the contact rivet 9 can also be connected via cables, for example if the steering wheel frame 2 is not to be produced from conductive material. In this case, of course, electric insulation of the wire element 12 is rendered superfluous.

Figure 4:
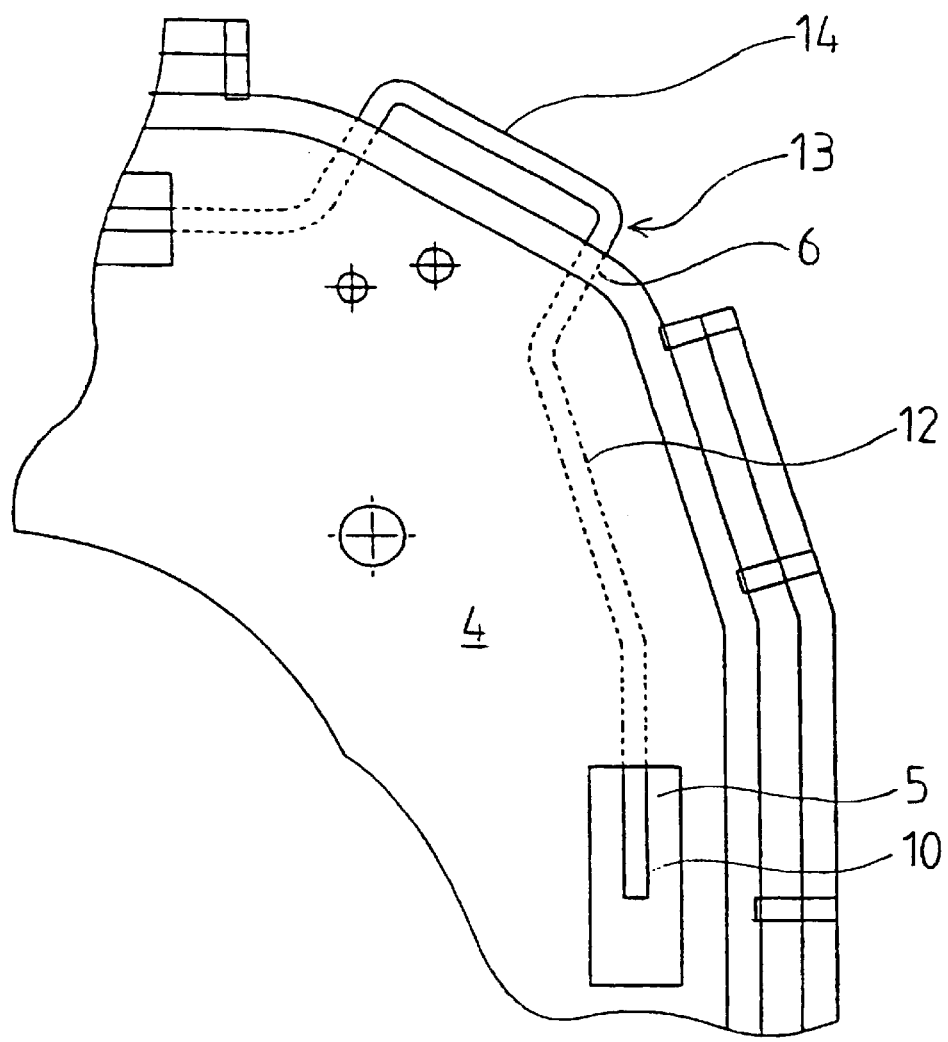
FIG. 4 shows a plan view of the generator support from FIG. 1 with the latching element inserted.

FIG. 4 shows a plan view of the generator support 4 of the airbag unit in the region of an electric connection 10 of the wire element 12. The connection 10 is arranged in a cutout 5, so that an electric contact connection via a connector lug is possible here.

Figure 5:
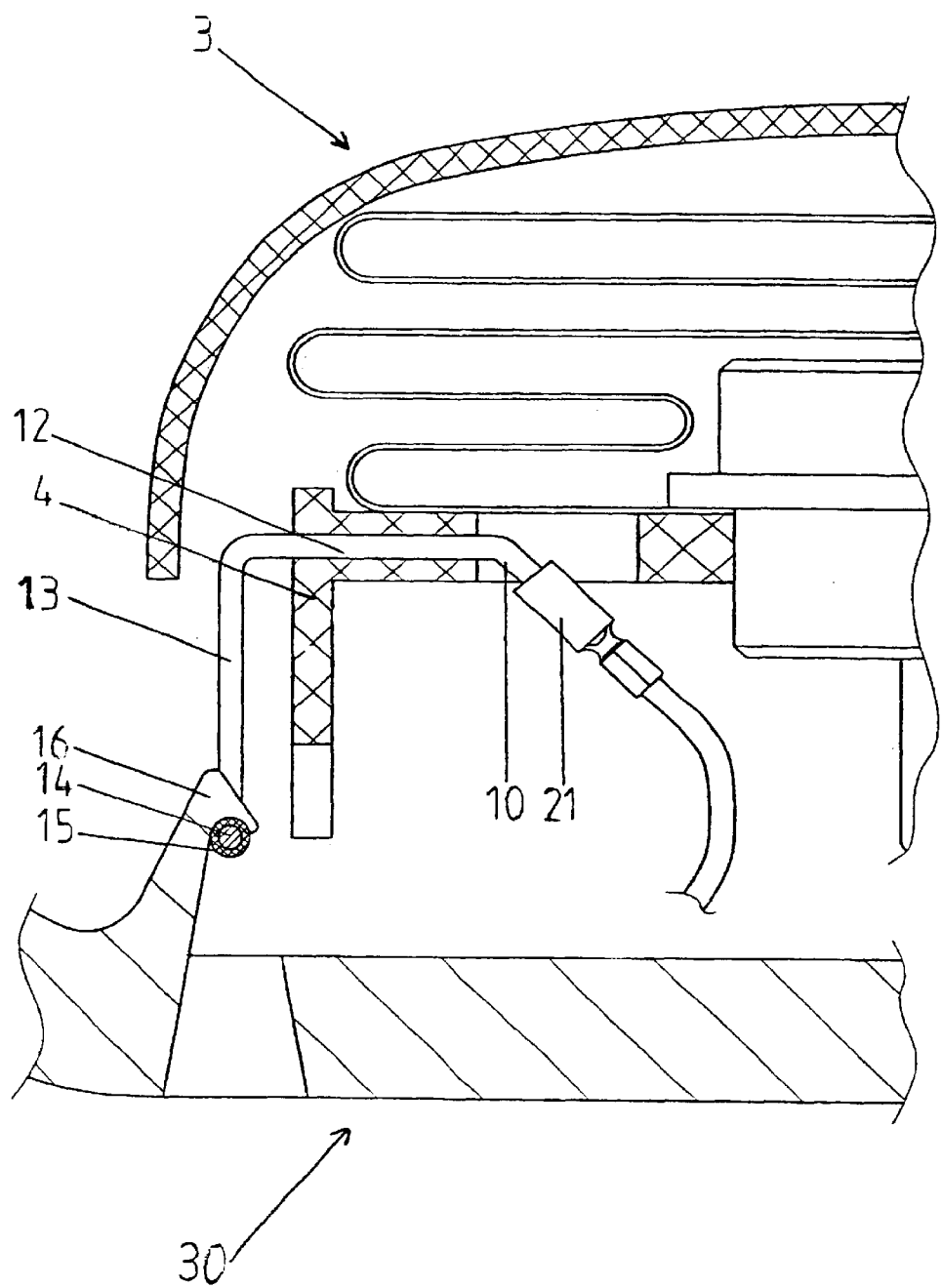
FIG. 5 shows a detailed view of an electric connection of the latching element.

FIG. 5 shows a detailed view of the electric connection of the wire element 12. The bow-shaped section 13 of the wire element 12 is shown. The bow-shaped section is held on the latching hook 16 and is electrically insulated in its lower region 14 with respect to the latching hook 16 by an insulating element 15.

In the cutout 5 of the generator support 4, the wire element 12 is connected by means of a connector lug 21 to the electric switching circuit of the horn (not shown).

Figure 6:
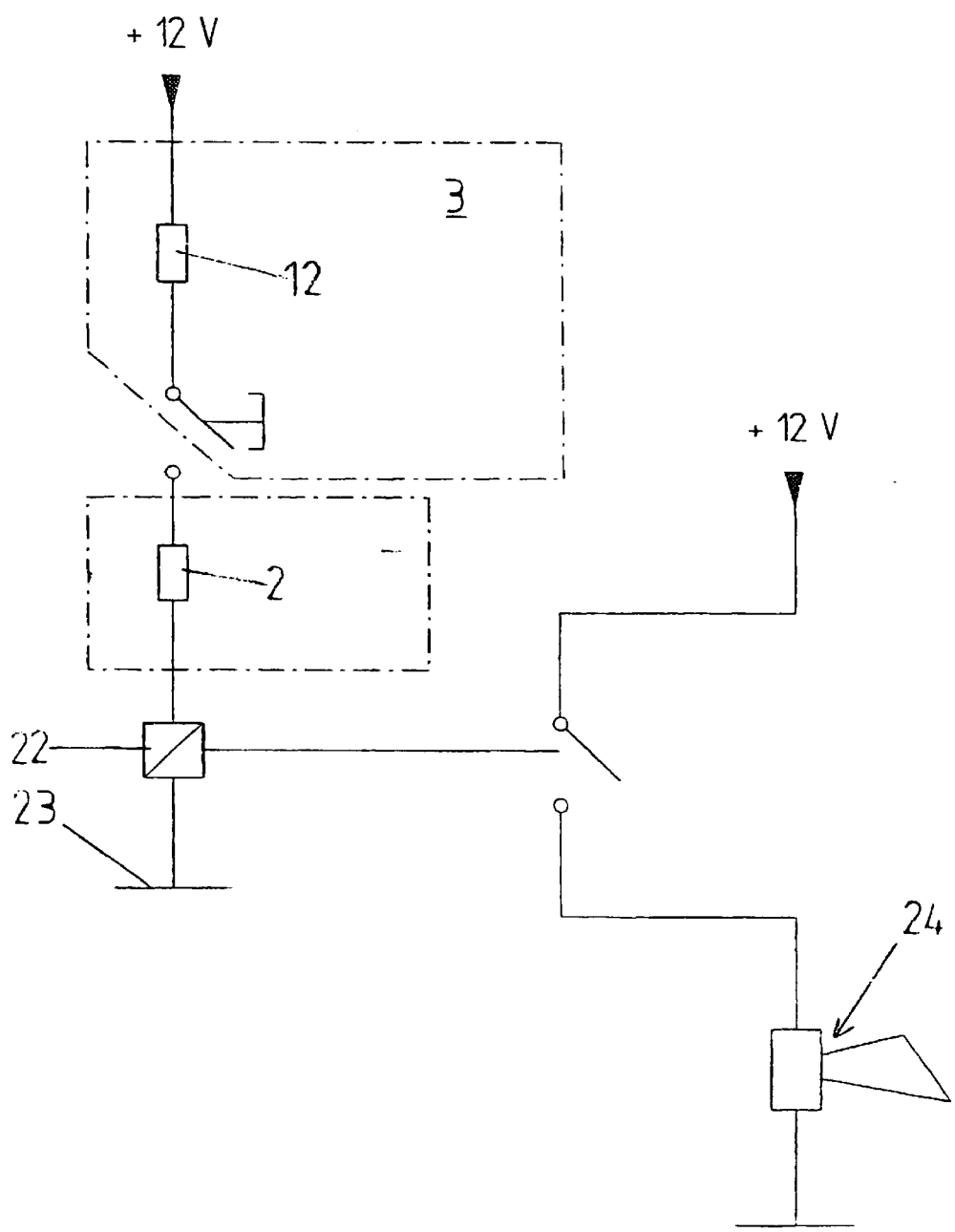
FIG. 6 shows a schematic illustration of a switching circuit of an electric horn having a latching element as the contact.

FIG. 6 illustrates a switching circuit diagram of the electric horn. The first contact 8 is formed by the wire element 12, symbolized here as a resistor. The second contact 9 is formed by a contact rivet which is connected tot he metal steering wheel frame 2 of the steering wheel body 30. A switching relay 22, which is coupled to the vehicle mass 23, produces the contact to the horn 24. Actuation of the airbag unit 3 causes the first contact 8 to be short-circuited by the second contact 9 and thus, via the switching relay 22, the horn 24 to be triggered.

Figure 7:
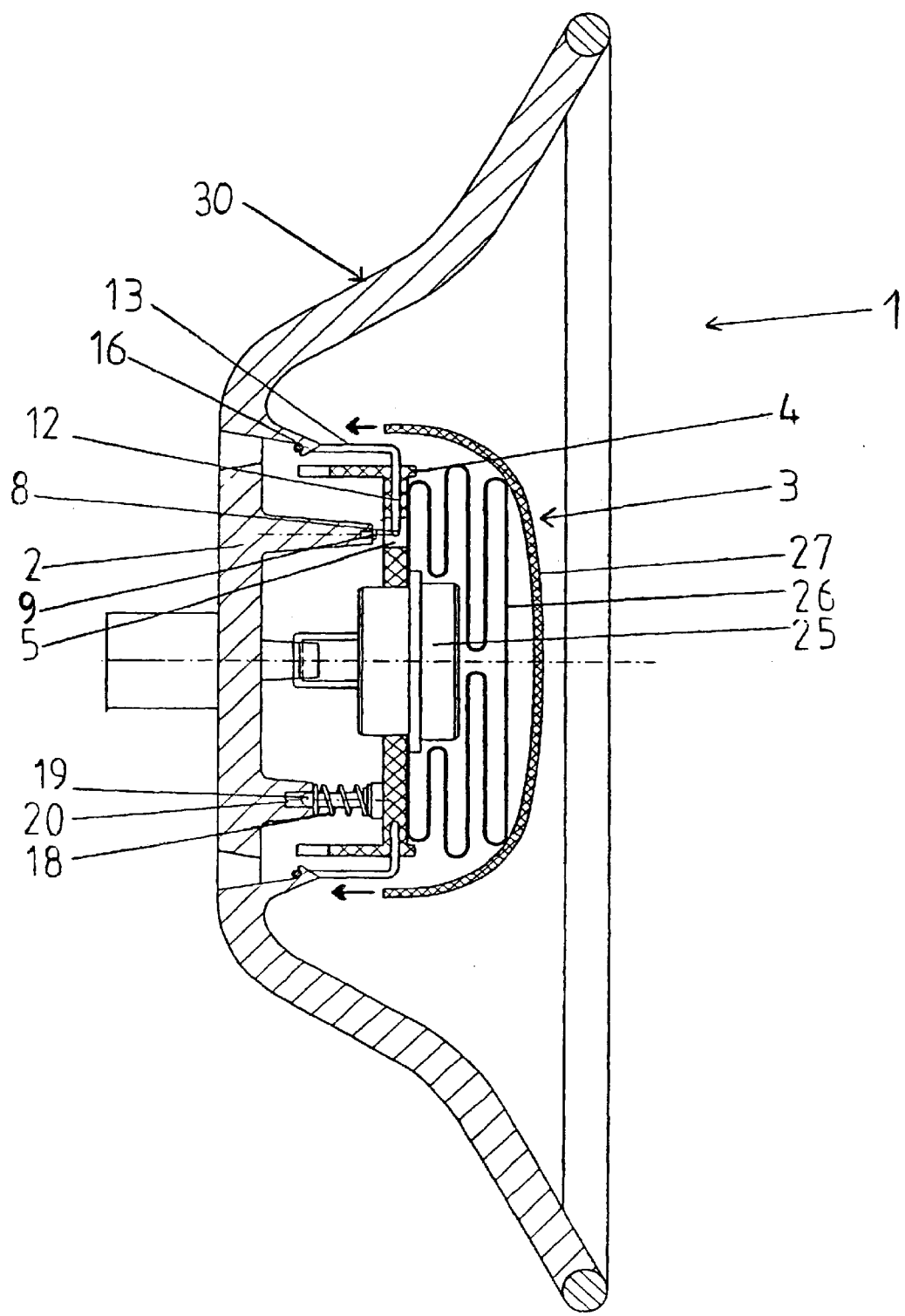
FIG. 7 shows a section through a steering wheel with an airbag unit fastened to it by means of a latching connection according to the invention.

FIG. 7 shows a section through a steering wheel 1 with an airbag unit 3 latched to the steering wheel body 30 by means of a steering wheel 1 according to the invention. The airbag unit 3 comprises the generator support 4 with the gas generator 25 fastened to it, the airbag 26 and the cover 27. The wire elements 12 can be seen in the generator support 4. The airbag unit 3 is latched via the bow-shaped sections 13 of said wire elements to the steering wheel body 30 at the latching hooks 16. In the region of the cutouts 5, the wire element 12, as the first contact 8, is assigned a contact rivet as the second contact 9. The distance between the airbag unit 3 and the steering wheel body 30 is defined by helical springs as spacer elements 18. Arranged within the helical springs 18 are pins 19 which engage in depressions 20 on the steering wheel body 30 and therefore prevent the airbag unit 3 from being displaced laterally with respect to the steering wheel body 30.

By pressure being exerted on the covering 27 of the airbag unit 3, the airbag unit 3 is moved in the direction of the arrow toward the steering wheel body 30 counter to the force exerted by the helical springs 18. In the process, the first contact 8 touches the second contact 9 and the horn (not shown here) sounds. As soon as the vehicle driver appropriately reduces the pressure on the covering 27 of the airbag unit 3, the helical springs 18 bring the airbag unit 3 back into the inoperative position and the horn contact is disconnected again.

With the latching arrangement according to the invention, an airbag unit can be installed on a steering wheel body in a simple manner which can be carried out without a tool. Due to the dual function of one of the latching elements, which at the same time forms a contact for the triggering of the horn, the number of parts can be reduced as can the expense of positioning the latching element and contact device.

Furthermore, by means of the arrangement according to the invention, the contact gap between the contacts of the horn can be reduced and therefore the esthetic impression improved.

Of course, instead of an encircling wire element in the form of a ring, a plurality of separate latching sections may also be used, if appropriate. In this manner, different contacts can be closed by a pressure on separate regions of the airbag unit, with the result that further and other functions can be realised in addition to the triggering of the horn.

Furthermore, the latching of an airbag unit to a vehicle part via wire bows can also advantageously be used in front-passenger and side airbags. In this connection, the electric contact can either be completely omitted or can be used for other electric functions.

What is claimed is:

1. A steering wheel having
   a steering wheel body,
   an airbag unit,
   a latching connection including a wire-shaped latching element that secures the airbag unit to the steering wheel body, and
   a contact device having at least one first and at least one second contact which, in order to trigger an electric functional element, are short-circuited if the airbag unit is moved in the direction of the steering wheel body due to a pressure exerted on the airbag unit,
   wherein the at least one first contact being a component of the latching element of the latching connection.

2. The steering wheel of claim 1, further comprising at least one elastic spacer element for setting a distance between the steering wheel body and the airbag unit wherein the spacer element can be deformed by a pressure being exerted on the airbag unit.

3. The steering wheel of claim 2, wherein the spacer element is formed by a structural element separate from the latching element.

4. The steering wheel of claim 2 wherein the spacer element is pretensioned so that the tension forces counteract the release of the latching connection.

5. The steering wheel of claim 2, wherein a helical spring forms the spacer element.

6. The steering wheel as claimed in claim 2, further comprising centering elements for securing against a lateral displacement of the airbag unit with respect to the steering wheel body.

7. The steering wheel of claim 6, wherein the spacer element is plugged onto a centering element.

8. The steering wheel of claim 1, wherein the latching element extends at least partially along the circumference of the airbag unit.

9. The steering wheel of claim 1, wherein the latching element has at least one bow-shaped section which, for latching purposes, is assigned a latching hook.

10. The steering wheel of claim 9, wherein the latching element is of annular design and the bow-shaped section extends essentially in a direction perpendicular with respect to a plane containing a generator support.

11. The steering wheel of claim 1, wherein the latching element is electrically insulated so that when the element is in the inoperative position the element is electrically insulated from the second contact.

12. The steering wheel of claim 11, wherein the latching element is insulated by a clip element, a shrinkable tubing or a coating of dipping paint.

13. The steering wheel as claimed in claim 1 wherein the second contact is electrically conductively connected to a frame the steering wheel.

14. The steering wheel of claim 1, wherein the second contact comprises a rivet.

15. The steering wheel of claim 1, wherein the first contact is arranged on the airbag unit and the second contact is arranged on the steering wheel body.

16. The steering wheel of claim 1, wherein the latching element is embedded in the airbag unit or in the steering wheel frame and wherein the airbag unit includes a cutout in the steering wheel frame and the latching element is accessible through said cutout.

17. The steering wheel of claim 1, wherein the latching element is not pretensioned.

* * * * *